(12) United States Patent
Albers et al.

(10) Patent No.: US 7,658,902 B2
(45) Date of Patent: Feb. 9, 2010

(54) LOW CTE HIGHLY ISOTROPIC GRAPHITE

(75) Inventors: Tracy Albers, Westlake, OH (US); Douglas J. Miller, North Olmsted, OH (US); Irwin C. Lewis, Strongsville, OH (US); David R. Ball, Bay Village, OH (US)

(73) Assignee: GrafTech International Holdings Inc., Parma, OH (US)

( * ) Notice: Subject to any disclaimer, the term of this patent is extended or adjusted under 35 U.S.C. 154(b) by 510 days.

(21) Appl. No.: 11/531,059

(22) Filed: Sep. 12, 2006

(65) Prior Publication Data

US 2008/0063590 A1    Mar. 13, 2008

(51) Int. Cl.
*C01B 31/04*    (2006.01)

(52) U.S. Cl. ..................... 423/448; 264/29.7

(58) Field of Classification Search ......... 423/448; 264/29.1, 29.2, 29.3, 29.4, 29.5, 29.6, 29.7
See application file for complete search history.

(56) References Cited

U.S. PATENT DOCUMENTS

| | | | |
|---|---|---|---|
| 2,734,800 A | 2/1956 | Brooks | |
| 3,460,907 A * | 8/1969 | Winsett | ....................... 423/448 |
| 4,017,567 A | 4/1977 | Hrovat et al. | |
| 4,190,637 A * | 2/1980 | Kennedy | ..................... 423/448 |
| 4,770,825 A * | 9/1988 | Sara | .......................... 264/29.1 |
| 5,107,437 A | 4/1992 | Miller | ........................ 364/476 |
| 5,607,770 A | 3/1997 | Lewis et al. | |
| 5,900,189 A * | 5/1999 | Kawano et al. | ............. 252/502 |
| 6,899,970 B1 | 5/2005 | Rogers et al. | |
| 6,933,531 B1 | 8/2005 | Ishikawa et al. | |
| 2002/0155293 A1 | 10/2002 | Lewis et al. | |
| 2004/0076810 A1 | 4/2004 | Blain et al. | |
| 2004/0091782 A1 | 5/2004 | Kawano et al. | |

OTHER PUBLICATIONS

Callister, Materials Science and Engineering—An Introduction, pp. 661-661 (5th ed., John Wiley & Sons. 2000).*
British Patent No. 1,098,882 issued to Bradwell et al.

* cited by examiner

*Primary Examiner*—Stanley S. Silverman
*Assistant Examiner*—Daniel C. McCracken
(74) *Attorney, Agent, or Firm*—Waddey & Patterson, P.C.; James R. Cartiglia

(57) ABSTRACT

A process for producing a graphite article having a CTE of less than about 2.0 ppm/° C. over the temperature range of from 30° C. to 100° C. and an isotropy ratio of less than about 1.5 also advantageously having a thermal shock resistance parameter of greater than about $150 \times 10^3$ W/m in both the with-grain and against-grain directions, and the graphite so produced.

25 Claims, No Drawings

LOW CTE HIGHLY ISOTROPIC GRAPHITE

BACKGROUND OF THE INVENTION

Technical Field

The present invention relates to a process for producing graphite which is highly isotropic and yet has a low coefficient of thermal expansion (CTE). The inventive graphite is formed from a needle coke substrate, and suitable for use in applications where thermal shock resistance or high temperature dimensional stability are desired, such as in rocket nozzles or hot pressing dies, or as a substrate for low thermal expansion coatings, such as ceramics like vapor deposited boron nitride, etc. More particularly, the present invention relates to a method of creating highly isotropic graphite, by which is meant graphite having an isotropy ratio of less than about 1.5, more preferably less than about 1.25, which is defined as the ratio of CTE in two directions, (specifically the isotropy ratio is calculated by dividing the against-grain CTE by the with-grain CTE), while having a CTE in each of the with-grain and against-grain directions of less than about 2.0 ppm/° C., more preferably less than about 1.0 ppm/° C., over the temperature range of from 30° C. to 100° C. Moreover, the graphite also exhibits a thermal shock resistance parameter of greater than about $150 \times 10^3$ W/m, preferably greater than about $200 \times 10^3$ W/m, in both the with-grain and against-grain directions (the thermal shock resistance parameter is calculated in accordance with the formula $(Ks)/(\alpha E)$, where K is the thermal conductivity in W/m-K, s is the tensile strength in psi, a is the CTE in ppm/° C. and E is the Young's modulus in psi). The invention also includes the novel low CTE highly isotropic graphite produced by the inventive process.

Synthetic bulk graphites are produced commercially for a variety of applications. The specific properties of these graphites are generally tailored for the desired end use, and are largely controlled by the choice of coke filler material and the forming method used. Since the coke filler constitutes the major material component of a graphite artifact, it has the largest effect on final graphite properties. It is conventional in the industry to use the coefficient of thermal expansion (CTE) as a key characterization parameter for commercial graphite. Other important properties are electrical and thermal conductivity, strength and the degree of isotropy. It has not been possible to vary all these properties independently.

For example highly anisotropic needle cokes are employed as fillers along with pitch binder to produce an extruded graphite electrode with a very low CTE, which can be used for the production of steel in electric arc furnaces. Such electrodes have CTE values less than 1.0 in the longitudinal (extruded) direction with a high degree of anisotropy (or low degree of isotropy) so that the transverse CTE is substantially higher. Anisotropy refers to the directional nature of certain properties of the graphite, and can be viewed as the analog to isotropy, which is a measure of the non-directional nature of certain properties of the graphite. The degree of anisotropy (which is also indicated by the isotropy ratio) for a graphite electrode as determined by the ratio of the CTE value in the transverse direction versus the corresponding value in the longitudinal direction, is greater than 1.7.

Isotropic cokes can also be employed as fillers to produce graphites by either extrusion or molding, which give high CTE values and are isotropic in their properties. Such graphites are used for nuclear reactors and other high temperature applications where dimensional stability or compatibility with high CTE materials is required. The use of isotropic coke results not only in high CTE but also a decrease in electrical and thermal conductivity. The CTE values for such graphites can range up to 5.0 ppm/° C. or higher over the temperature range of from 30° C. to 100° C. while being highly isotropic (in other words where the isotropic ratio approaches 1.0). There is no known method for producing a graphite which couples low CTE with high isotropy.

Generally, the process of making graphite articles first includes the selection of the type of calcined coke to be employed, and the coke is subsequently broken into smaller particles and either crushed or milled prior to processing into graphite. Most often the crushed calcined coke is mixed with a type of binder, most generally a pitch. Pitch is a complex mixture of polynuclear aromatics derived from the thermal treatment of coal tar or petroleum tar. At ambient temperature, pitch appears solid but it is actually a liquid with an extremely slow flow rate. The pitch is mixed with the crushed coke to form a relatively solid product often known in the graphite industry as a green article.

At this point, the green article is shaped into the cross-sectional configuration which is desired for the final graphite product. Most commonly, extrusion is used to form the general shape of the green article prior to graphitization.

As is known in the art, extrusion is a process wherein the binder and coke mixture is pushed through a die to create an article with a fixed cross section. In forming graphite articles, the green article is heated so that it will flow more easily through the die, thus requiring less pressure and force to create the generic shape.

Additional means for shaping green articles for forming graphite include both molding and pressing wherein pressure is typically supplied from either one or two directions to influence the green article into a desired configuration. Additionally, the mixture can be heated to facilitate greater ease in molding to the desired shape.

The next step in producing graphite usually entails baking the green article to remove volatile constituents, and more importantly, to convert the pitch binder into a solid carbonaceous material capable of holding and maintaining a rigid shape. During baking, the gases driven off from the green article often cause small channels and pores within the article providing for an extended and open porosity throughout the carbon body. As such, additional pitch is impregnated into the baked article to fill the voids left from the escaping volatile gases, and thus, densify the baked carbon body. Typically, impregnating pitches are solid at room temperature and must be preheated to a high temperature to transform them to a low viscosity liquid suitable for impregnation. It is also conventional to preheat the carbon body to an elevated temperature before adding the pitch impregnant.

The carbon body with pitch impregnant is then cooled to solidify the impregnant within the carbon body. After the pitch is impregnated into the carbon body, the carbon body with impregnant is normally rebaked to carbonize the impregnant. This process may be repeated several times so as to achieve the required density for the carbon article to be later graphitized.

The graphitization of the carbon bodies of the prior art include heat treatments at temperatures from about 2000° C. to about 3500° C., typically through use of an electric current. Most often the heat treatment process takes place over a period of many hours, and, in some circumstances, several days and converts the carbon body into a graphite material having an internal lattice-type structure.

Since the graphite produced by the inventive process exhibits large crystallite size in relation to its CTE, it can have application for nuclear reactors. In nuclear applications, the graphite article is required to be relatively free of impurities, such as when used for fuel elements, moderator blocks and reflector blocks in the new generation of nuclear fission high temperature and very high temperature reactors. Essentially, these reactors are of two main designs, a prismatic design and a pebble bed design. For both of these nuclear reactor designs, the graphite can be used as a moderator to thermalize neutrons as well as for a neutron reflector. Yet furthermore, graphite used in nuclear reactors may also be used as structural fuel elements which can provide the network of channels for fuel and coolant gases surrounding the reactor. As nuclear graphite necessitates extremely low levels of impurities within the graphite structure, notably an ash amount less than about 300 parts per million and a boron equivalence of less than 10 parts per million, more preferably less than about 5.0 parts per million, the graphite is usually treated post-graphitization with a gas treatment at temperatures over about 2000° C. More specifically, the graphite undergoes treatment with a halogen gas at temperatures of from about 2200° C. to about 2600° C. to remove impurities so that the graphite does not exceed the desired maximum level of impurities.

Another method of forming a graphite article from the "green" mixture is referred to as isostatic molding, and the resulting article referred to as an isomolded product. In the isostatic forming process there are two main features leading to more isotropic properties in the graphite product. Filler particles are mixed with binder and sized into a molding powder, which is made up of particles that are agglomerates of filler bound with binder. These agglomerates have a much lower aspect ratio than the filler particles within them but still tend to have a measurable aspect ratio reflecting a general alignment of the particles within. The molding powder is charged to a flexible bag mold and sealed. The mold is then place into a hydroclave. Densification of the molding powder is achieved by pressurizing the fluid in the hydroclave. This compacts the article nearly evenly from all directions. The resultant article is more isotropic than if the same filler particles were mixed with binder and extruded because there is less orientation in the molding powder and less orientation in the compaction.

Isostatic molding is typically used with relatively fine (i.e., less than 75 micron) filler particles produced from raw coke, calcined coke, graphitized coke, or recycled graphite. The industrial applications for isostatically molded graphite generally value its ability to be machined to a fine finish, its isotropy, and high strength. When poorly graphitizing cokes, otherwise known as "isotropic" cokes, are used to produce isostatically molded graphite the isotropy ratio can approach 1.0, however the CTE value of such graphite is always above 3 ppm/° C. over the temperature range of from 30° C. to 100° C. When highly graphitizable cokes are used to produce isostatically molded graphite the isotropy ratio is greater than 1.7. The CTE of such graphite depends on whether the graphitizable coke was milled in the raw state or the calcined state. If it was milled in the raw state the CTE will be greater than 3.5 ppm/° C. over the temperature range of from 30° C. to 100° C. If the coke was calcined before milling the CTE will be greater than 2.0 ppm/° C. over the temperature range of from 30° C. to 100° C.

Thus, commercial graphite production processes have not to date been capable of producing a highly isotropic graphite article having a CTE of below 2.0 ppm/° C. over the temperature range of from 30° C. to 100° C. Indeed, to date, no highly isotropic graphite articles having a thermal shock resistance parameter of 150×10³ W/m or greater in both directions have been commercially produced. In order to be useful in applications where thermal shock resistance or high temperature dimensional stability are desired, or as a substrate for low thermal expansion coatings, what is desired is a process for producing a graphite having an isotropy ratio of less than about 1.5, a CTE of below 2.0 ppm/° C. over the temperature range of from 30° C. to 100° C., and having a thermal shock resistance parameter of greater than about 150×10³ W/m in both directions.

SUMMARY OF THE INVENTION

The present invention provides graphite suitable for applications where a combination of isotropy and low CTE are useful. Indeed, the graphite produced in accordance with the present invention exhibits a thermal shock resistance parameter of greater than about 150×10³ W/m in both directions, making it uniquely useful for applications such as rocket nozzles and the like.

More particularly, the inventive graphite is highly isotropic, meaning it has an isotropy ratio of from about 0.85 to about 1.5 measured by dividing the against-grain CTE by the with-grain CTE. Preferably, the isotropy ratio of the inventive graphite is less than about 1.25. Indeed, the inventive graphite can be characterized as "near-isotropic", meaning it has an isotropy ratio of less than about 1.15 or even "isotropic", meaning it has an isotropy ratio of less than about 1.10, while having a CTE of less than about 2.0 ppm/° C., more preferably less than about 1.0 ppm/° C., over the temperature range of from 30° C. to 100° C.

The inventive graphite is produced by milling raw needle coke such as petroleum-derived needle coke into a fine powder, mixing the fine coke powder with binder pitch, and subsequently milling the mixture into a molding powder. A doping agent, generally referred to in the industry as a graphitization catalyst, especially one containing boron, is included in the mixture of coke and pitch, preferably prior to milling into the molding powder. The molding powder is then isostatically molded into the desired shape of the graphite component, and thereafter baking, densifying, and graphitizing the article to produce a low CTE highly isotropic graphite having a high thermal shock resistance parameter.

An object of the invention, therefore, is the production of a graphite article having both a CTE of less than about 2.0 ppm/° C. over the temperature range of from 30° C. to 100° C. and an isotropy ratio of less than about 1.5.

Another object of the invention is the production of a highly isotropic graphite article having a thermal shock resistance parameter of greater than about 150×10³ W/m, more preferably greater than about 200×10³ W/m, when measured in either of the longitudinal and transverse directions.

Still another object of the invention is a process for producing the low CTE highly isotropic graphite of the present invention.

These aspects and others that will become apparent to the artisan upon review of the following description can be accomplished by providing a raw needle coke such as petroleum-derived needle coke and milling the raw needle coke into a powder and subsequently combining the fine powder with binder pitch and a graphitization catalyst, milling the resulting mixture into a molding powder, isostatically molding the molding powder into a desired shape of the graphite component and further baking, densifying, and graphitizing the component to create a low CTE highly isotropic graphite. The resulting graphite has an isotropy ratio of from about 0.85 to about 1.5, a CTE of less than about 2.0 ppm/° C. over the temperature range of from 30° C. to 100° C. and a thermal shock resistance parameter of greater than about 150×10³ W/m in both directions.

It is to be understood that both the foregoing general description and the following detailed description provide embodiments of the invention and are intended to provide an overview of framework of understanding to nature and character of the invention as it is claimed.

DETAILED DESCRIPTION OF THE PREFERRED EMBODIMENTS

As noted above, the inventive graphite can be fabricated by first milling needle coke into a powder combining the milled powder with pitch and a graphitization catalyst to form a mixture which is subsequently milled and processed to eventually form a low CTE highly isotropic graphite. More specifically, the needle coke is sized and milled to an average diameter such that 95% passes through an opening of about 100 microns (referred to in the industry as "passing about 100 microns"), more preferably 95% passing about 75 microns, and most preferably such that 95% passing about 44 microns (which is equivalent to a U.S. mesh size of 325). From a practical standpoint, the needle coke is milled to an average diameter which is at least about 2 microns. The particle size of the milled needle coke is selected according to certain desired physical properties of the graphite, such as flexural strength, density, electrical resistance, thermal conductivity, etc. and is within the skill of the art. For instance, smaller particles within the aforementioned sizes may be included to provide for more strength.

The inventive process includes the use of raw (i.e. not calcined) needle coke preferably from petroleum for the basic carbon constituent of the graphite, although coal-based needle cokes, or needle cokes from other sources, can also be employed. The specific properties of the needle coke are dictated through the control properties of the coking process in which an appropriate carbon feedstock is converted into the needle coke. Typically, needle coke is defined as a coke with a coefficient of thermal expansion of less than about 0.4 ppm/° C. over the temperature range of from 30° C. to 100° C.

The raw needle coke is milled to a fine powder such that 95% is passing 100 microns, more preferably 75 microns, and most preferably wherein about 95% of the milled coke passing 44 microns. The milling of the needle coke is useful to provide a lower aspect ratio coke particle than is obtained by milling calcined needle coke. The milled raw coke particles exhibit reduced graphitic crystal orientation so as to preclude an anisotropic characteristic in the nuclear graphite. This is necessary as calcined needle coke has an acicular morphology or oriented needle-like structures with a high degree of crystal alignment resulting in substantial anisotropic properties.

The powdered needle coke is then mixed with pitch, such as a coal tar binder pitch, which has been preheated to convert the pitch to a low viscosity liquid suitable for creating a homogeneous mixture of pitch and powdered coke. In a further embodiment, the coke will also be preheated to an elevated temperature before adding the pitch so as to improve the homogeneity of the resulting mixture, which is considered a needle coke and pitch mixture. Typically the mixture of pitch and needle coke contains between about 20 parts binder pitch per hundred parts coke and about 80 parts binder pitch per hundred parts coke, and preferably between about 40 and about 70 parts binder pitch per hundred parts coke.

The needle coke and pitch mixture also comprises a doping agent commonly referred to as a graphitization catalyst. Preferred among these is boron, either by itself or present in a compound such as boron carbide. The doping agent is present at a level of at least about 0.5%. From a practical standpoint, the doping agent should not be present at a level greater than about 10% of the needle coke and pitch mixture. Indeed, if purification of the final graphite article to remove the boron is contemplated, such as would be desired for use in nuclear applications, inclusion of greater than 10% boron would result in a purified graphite article having an undesirable level of voids in its structure. The boron or other doping agent is sized to approximately the same particle size as the milled needle coke.

The needle coke/pitch/boron mixture is then milled into a molding powder for the subsequent isostatic molding process. Generally, the mixture is milled to a particle size of about 95% passing 150 microns, and preferably 95% passing 44 microns. Baking prior to milling is not required, as it is in some conventional graphite production processes such as the process referred to in the art as BAN processing and generally described in British Patent No. 1,098,882, providing another cost and time savings in the inventive process.

The molding powder is then formed into a large block shape through isostatic molding as is described in U.S. Pat. No. 5,107,437, the disclosure of which is incorporated by reference herein. Isostatic molding is a pressing process for densifying a powdered composition into a compact shape at pressures sufficient to obtain near theoretical density. The molding powder is densified under pressure acting through a suitable fluid medium, preferably a liquid, to achieve an omnidirectional high green density. Neither extrusion, uniaxial molding or vibrational molding are suitable for forming the desired highly isotropic graphite of the present invention as extrusion, uniaxial molding and vibrational molding all produce a product having an orientation of particles following the shape of the formed product. This orientation can result in a graphite product with marked anisotropy.

In the isostatic molding, the molding powder is pressed into a densified compact shape within an elastomeric mold or design bag. The isostatic mold is then sealed to prevent the ingress of isostatic fluid and subsequently loaded into a supporting structure to form a mold assembly. This loaded mold assembly is placed within a pressure vessel, wherein the vessel is subsequently filled with an isostatic fluid and sealed. Typically, an isostatic molding pressurization pump is activated to raise the pressure in a controlled rate so that the density of the resulting green article of powdered needle coke and pitch reaches a desired density point. Once the density of the mixture within the isostatic mold is achieved, the system is depressurized and the novel green article is removed. Typically this density mirrors the final density of the graphite product, generally from about 1.2 g/cc to about 1.8 g/cc. By isostatically molding the molding powder into a green article rather than by using conventional extrusion or uniaxial molding of a hot mix, any tendency during the formation to favor a latent preferred orientation is substantially reduced.

After the isostatic molding, the molded article is heat treated by baking at a temperature of from about 700° C. to about 1100° C. and more preferably between about 800° C. and about 1000° C. so as to carbonize the pitch binder to solid coke to create a carbonaceous article which has a permanency of form, high mechanical strength, good thermal conductivity and comparatively low electrical resistance. Most often, the green article is baked in the relative absence of air to avoid oxidation with the temperature increased at a rate of about 1° C. to about 5° C. per hour until the final temperature is achieved. After baking, the carbonaceous article may be impregnated one or more times with pitch to deposit additional pitch coke in any open pores of the article. Preferably, the article is only impregnated one additional time with a pitch material. After baking, the article referred to at this stage as a carbonized graphite precursor is then graphitized.

Graphitization is by heat treatment at a final temperature of between about 2400° C. and about 3500° C. for a time sufficient to cause the carbon atoms in the carbonized graphite precursor to transform from a poorly ordered state into the crystalline structure of graphite. Advantageously, graphitization is performed by maintaining the carbonized graphite precursor at a temperature of at least about 2700° C., and more advantageously, at a temperature of between about 2700° C. and about 3200° C. The time required for maintenance at the graphitization temperature using the process of the present invention is generally less than about 12 hours.

The boron level in the graphite article and the specific temperature of graphitization can be balanced to provide the desired properties in the finished graphite article. Thus, either the combination of a higher graphitization temperature with a lower boron level, or a lower graphitization temperature with a higher boron level, will produce a thermal shock resistance parameter in the graphite article of at least about $150 \times 10^3$ W/m in both directions. The specific balancing between graphitization temperature and boron level is within the skill of the artisan.

Once graphitization is completed, the finished graphite can be cut to size, machined, otherwise formed or left in its original configuration. Furthermore, post-graphitization purification can be employed to reduce the boron equivalence to less than about 10.0, more preferably less than about 5.0, and most preferably less than about 2.0 parts per million, in order to provide a graphite suitable for use in nuclear applications.

The graphite prepared in accordance with the present invention exhibits improved isotropy with the isotropy ratio from about 0.85 to about 1.5, preferably from about 0.85 to about 1.25, more preferably from about 0.85 to about 1.15, and most preferably from about 0.85 to about 1.10, with a CTE of less than about 2.0, more preferably less than about 1.0, ppm/° C., over the temperature range of from 30° C. to 100° C. Advantageously, the resulting graphite article has a thermal shock resistance parameter of at least about $150 \times 10^3$ W/m, more advantageously, at least about $200 \times 10^3$ W/m, in both the with-grain and against-grain directions, levels heretofore not achievable in a highly isotropic graphite article.

Furthermore, by varying the size of the powdered needle coke, one can create a graphite with the desired flexural strength, density and thermal conductivity to fit a specific application.

Yet furthermore, the produced graphite will typically have an average density of greater than about 1.5 g/cc. The flexural strength of the novel graphite is typically from about 10 MPa to about 40 MPa while still having a thermal conductivity of greater than about 60 W/m-K. As noted, the graphite can be purified to remove the boron, by treating the graphite with a halogen gas at temperatures of from about 2200° C. to about 2600° C. In this case, the thermal conductivity of the resulting article can be brought to greater than about 100 W/m-K, to 130 W/m-K or even as high as 200 W/m-K or higher, providing for the first time a highly isotropic graphite with significant thermal conductivity.

The following examples are presented to further illustrate and explain the present invention and should not be viewed as limited in any regard. Unless otherwise indicated, all parts and percentages are by weight and are based on the weight of the product at the particular stage in processing indicated.

EXAMPLE 1

A raw needle coke is milled to an average particle size of 25 microns and mixed with 60 parts coal tar binder pitch per hundred parts coke. The cooled mix is milled to an average size of 35 microns and isostatically molded. The billet is processed normally and graphitized to over 3000° C. The resulting graphite physical properties are characterized in Table I.

EXAMPLE 2

A raw needle coke is milled to the same size as in Example 1 and then blended with similarly sized boron carbide powder to produce three blends. This blend is mixed with 60 parts coal tar pitch binder per one hundred parts coke so as to provide three blends, one having 5.0% by weight boron, one having 5.5% by weight boron and one having 7% by weight boron, and processed the same as in Example 1, except that the 5.5% and 7% boron samples were graphitized to under 2600° C., whereas the 5% boron sample was graphitized to over 3000° C. The resulting graphite physical properties are also characterized in Table I. In addition, the 5% boron sample was also partially purified after graphitization to remove some of the boron, and exhibited a thermal conductivity of greater than about 130 W/m-K.

TABLE I

| Sample ID | Density g/cc | WG Flexural Strength MPa | AG Flexural Strength MPa | WG Youngs Modulus GPa | WG Specific Resistance micro ohm m | WG CTE (1" cube) ppm/° C. | AG CTE (1" cube) ppm/° C. | WG Thermal Conductivity W/mK | AG Thermal Conductivity W/mK |
|---|---|---|---|---|---|---|---|---|---|
| 0% Boron | 1.72 | 28 | | 7.9 | 7.3 | 3.8 | 5.1 | 130 | |
| 5% Boron | 1.6 | 23 | 23 | 13.8 | 8.8 | 0.65 | 0.77 | 70 | 70 |
| 5.5% Boron | 1.7 | 31 | 34 | 16.7 | 8.04 | 1.22 | 2.01 | 81.8 | 72.7 |
| 7% Boron | 1.71 | 15 | 15 | 18.1 | 9.41 | 0.56 | 0.54 | 67.2 | 65 |

The above description is intended to enable the person skilled in the art to practice the invention. It is not intended to detail all the possible variations and modifications that will become apparent to the skilled worker upon reading the description. It is intended, however, that all such modifications and variations be included within the scope of the invention that is defined by the following claims. The claims are intended to cover the indicated elements and steps of any arrangement or sequence that is effective to meet the objectives intended of the invention unless the context specifically indicate the contrary.

What is claimed is:

1. A method of producing low CTE highly isotropic graphite, comprising:
   a. mixing raw powdered needle coke and a catalytic doping agent with binder pitch to form a doped coke mixture;
   b. milling the doped coke mixture to create a molding powder;
   c. isostatically molding the molding powder into a desired shape to form a green article;
   d. graphitizing the processed carbonaceous article to obtain a graphite article having a coefficient of thermal expansion in each direction of no greater than about 2.0 ppm/° C. over the temperature range of from 30° C. to 100° C. and an isotropy ratio of less than about 1.5.

2. The method of claim 1 wherein step d) further comprises baking the green article at a temperature of from about 700° C. to about 1100° C. prior to graphitization to create a baked carbonaceous article.

3. The method of claim 1 wherein the needle coke is petroleum coke.

4. The method of claim 1 wherein the powdered needle coke has a particle size such that 95% is passing about 75 microns.

5. The method of claim 4 wherein about 95% of the powered needle coke is passing about 44 microns.

6. The method of claim 1 wherein the doping agent comprises boron.

7. The method of claim 6 wherein the doping agent comprises boron carbide.

8. The method of claim 6 wherein the doping agent is present in the doped coke mixture at a level of at least about 0.5%.

9. The method of claim 8 wherein the doing agent is present in the doped coke mixture at a level of no greater than about 10%.

10. The method of claim 6 wherein about 95% of the molding powder of step b) passes through a mesh opening of approximately 150 microns.

11. The method of 1 which further comprises purifying the graphite article to provide a graphite article having a boron equivalence of less than about 5.0 parts per million.

12. A graphite article produced in accordance with the method of claim 1.

13. A graphite article produced in accordance with the method of claim 6.

14. A synthetic graphite article comprising graphite having a CTE in each direction of no greater than about 2.0 ppm/° C. over the temperature range of from 30° C. to 100° C. and an isotropy ratio of less than about 1.5.

15. The article of claim 14 wherein the CTE in each direction is no greater than about 1.0 ppm/° C. over the temperature range of from 30° C. to 100° C.

16. The article of claim 14 wherein the isotropy ratio is less than about 1.25.

17. The article of claim 16 wherein the isotropy ratio is less than about 1.10.

18. The article of claim 14 wherein the thermal shock resistance parameter is greater than about $150 \times 10^3$ W/m in both the with-grain and against-grain directions.

19. The article of claim 18 wherein the thermal shock resistance parameter is greater than about $200 \times 10^3$ W/m in both the with-grain and against-grain directions.

20. A synthetic graphite article comprising graphite having an isotropy ratio of less than about 1.5 and a thermal conductivity of at least about 130 W/m-K.

21. The article of claim 20 wherein the isotropy ratio is less than about 1.25.

22. The article of claim 21 wherein the isotropy ratio is less than about 1.10.

23. The article of claim 20 having a CTE in each direction of no greater than about 2.0 ppm/° C. over the temperature range of from 30° C. to 100° C.

24. The article of claim 20 wherein the thermal shock resistance parameter is greater than about $150 \times 10^3$ W/m in both the with-grain and against-grain directions.

25. The article of claim 24 wherein the thermal shock resistance is greater than about $200 \times 10^3$ W/m in both the with-grain and against-grain directions.

* * * * *

UNITED STATES PATENT AND TRADEMARK OFFICE
CERTIFICATE OF CORRECTION

PATENT NO. : 7,658,902 B2 Page 1 of 1
APPLICATION NO. : 11/531059
DATED : February 9, 2010
INVENTOR(S) : Albers et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 620 days.

Signed and Sealed this

Thirtieth Day of November, 2010

David J. Kappos
*Director of the United States Patent and Trademark Office*